United States Patent Office 3,761,225
Patented Sept. 25, 1973

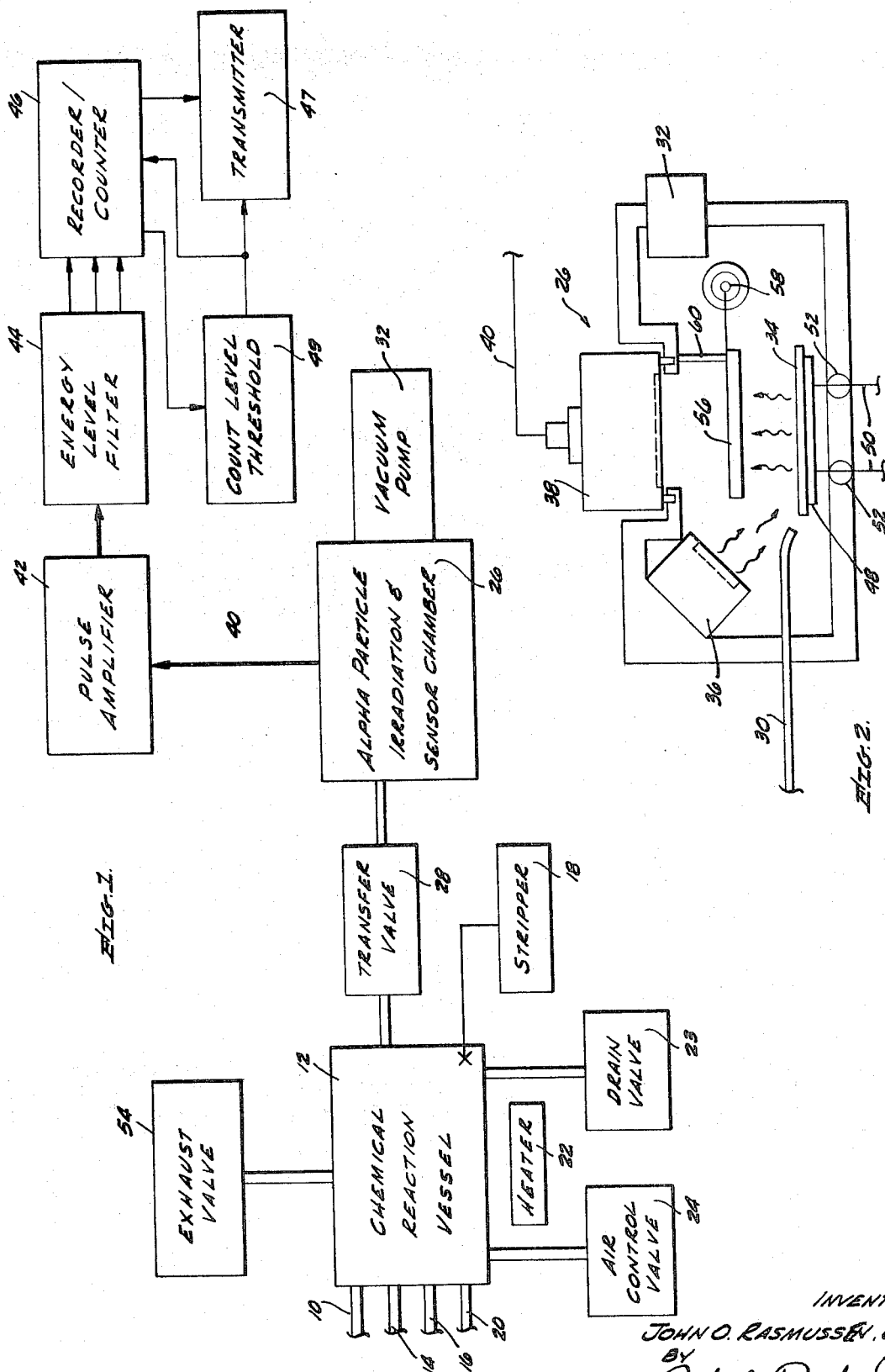

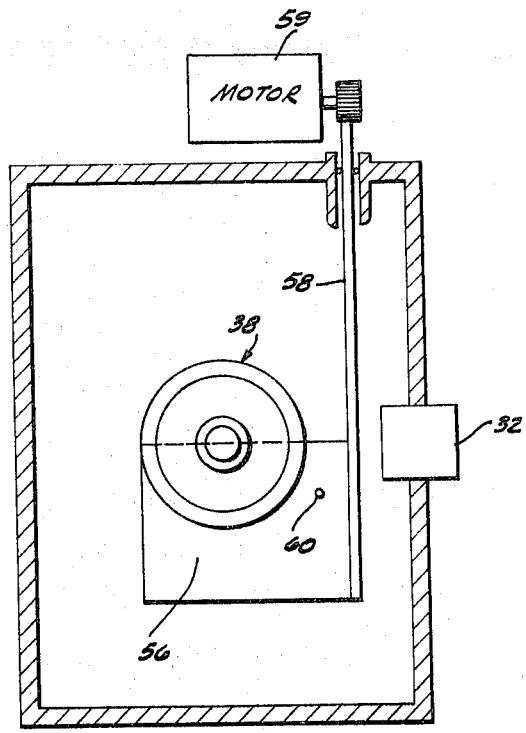
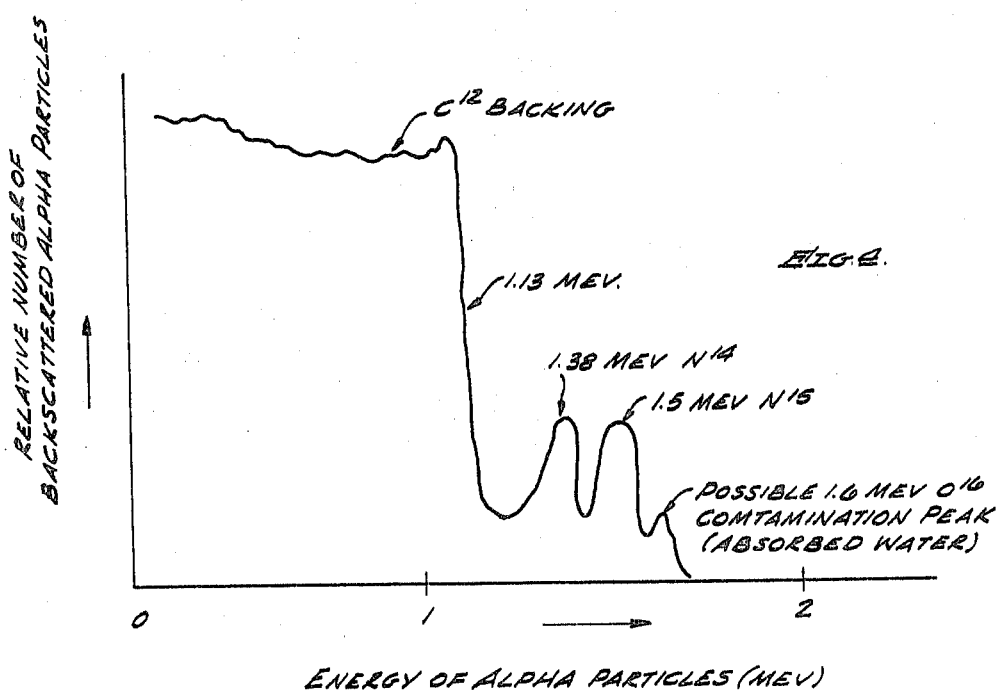

3,761,225
NUCLEAR BACKSCATTER ANALYZER FOR
QUANTITATIVE ANALYSIS USING ISOTOPE
RATIO METHOD
John O. Rasmussen, Jr., 207 Armory St.,
Hamden, Conn. 06511
Filed Dec. 2, 1970, Ser. No. 94,456
Int. Cl. G01n 23/12
U.S. Cl. 23—230 R
29 Claims

ABSTRACT OF THE DISCLOSURE

The method and apparatus for measuring the concentration of various selected compounds in a sample by monitoring nuclear reactions resulting from irradiation of the sample by alpha particles. Prior to the irradiation, the sample is "spiked" with a measured amount of a substance containing an element of the compound to be measured in the form of a rare isotope. Backscattered alpha particles are detected and analyzed as a function of their relative energy levels. The ratio of the number of alpha particles having energy levels corresponding to the element of the compound whose concentration is to be measured, to the number of alpha particles having energy levels corresponding to the isotope of this element, is an accurate measure of the concentration of the selected compound.

BACKGROUND OF THE INVENTION

(A) Field of the invention

This invention relates generally to the method and apparatus for measuring the concentration of certain chemical substances in liquid or gaseous environments; and more specifically to such a method and apparatus for the quantitative analysis of a sample by "doping" the sample with a known quantity of an element of unnatural isotopic composition of the element to be measured and detecting the nuclear reaction products or back scattering alpha energies during irradiation of the sample-isotope mixture with alpha particles. The invention is particularly adaptable to remote automated data gathering—such as required in pollution measurement and abatement applications.

(B) Discussion of the prior art

There is an increasing need in pollution control and abatement applications, to obtain safe, accurate and reliable quantitative analysis. Wet chemistry, while continually being improved and being quite acceptable for some applications, has severe limitations in other applications; such as extensive processing times and questionable quantitative accuracy. For example, conventional chemical methods for quantitative analysis of dissolved forms of nitrogen compounds are subject to chemical yield uncertainties or interference from other substances. In the minute concentrations occurring in natural waters, traditional procedures for analysis of ammonium, nitrate or cyanide ion concentrations are often beyond the limitations of conventional chemical methods. Cyanide analysis is further complicated in certain applications where the ions are "tied up" in complexes with heavy metal ions. The problem of variable yields and small yields, for example, in the removal of ammonium by Nesslerization further complicates prior art techniques. Additionally automated analyzers using wet chemical analysis techniques require the frequent replenishment of chemical solutions and are often relatively complicated and bulky.

With the ever increasing scope of pollution problems the traditional quantitative analysis techniques are becoming inconvenient and/or inadequate. Many of the prior art techniques do not lend themselves to automated operation, such as, for example, water quality monitoring. In the maintainance of the quality of bodies of water, it is important to monitor the concentration of nitrogen and cyanide compounds, since the level of the former compounds effects the growth of algae and other plant life while excessive levels of the latter compounds are injurious to fish life. Heavy loading of nitrogen and cyanide compounds may enter fresh water streams from agricultural runoff carrying dissolved chemical fertilizers, or from industrial processing plants.

As is evident from developments in the field of automated wet chemistry methods of quantitative analysis such as outlined in U.S. Pats. 3,036,893, 3,080,218 and 3,186,799, great ingenuity has been applied to refine and optimize these prior art techniques. Also it has been proposed that in certain applications, some elements may be quantitatively analyzed by the detection of gamma emissions from radio active isotopes naturally present in the sample, as disclosed in U.S. Pat. 3,332,744; and atomic spectrophotometry is applicable to other types of analysis methods as taught in U.S. Pat. 3,469,308.

It is perhaps the recognition of the complexity of the prior art devices which led to the conclusion that these approaches are reaching the point of diminishing returns, and that to realistically deal with the ecological problems of air and water pollution abatement presently facing society, new and unique approaches are mandatory. In search of such a new solution, the techniques developed by Turkevich and associates, and used in obtaining the first chemical analysis of the moon during the surveyor series of instrumented soft landings were considered relative to the problem of quantitative analysis of selected compounds. The lunar sample device is described in a paper by Turkevich, Patterson and Franzgrote, entitled "Chemical Analysis Experiment for the Surveyor Lunar Mission," Journal of Geophysical Research, 72, 831 Jan. 15, 1967. The principles were earlier outlined in a paper by Turkevich in Science 134, 3480, Sept. 8, 1961.

The recognition of the feasibility of applying some of the lunar detection techniques to the quantitative analysis of volatile substances by use of a novel isotope ratio or isotope-dilution method is a significant aspect of the subject invention. The method proposed by Turkevich and his associates did not contemplate the measurement of the ratio of a selected element and the isotopic composition thereof, nor was their method extended to thin samples absorbed onto backing material of lower atomic weight. The spectra resulting from the lunar analyzer device were in the form of "stair steps" requiring computer analysis for unfolding, and they did not provide the resolvable peaks facilitating easy direct measurement obtainable in accordance with the subject invention.

Also the isotope ratio method in accordance with the subject invention does not require known or reproducible yields of the substance being measured; as it is only necessary that the added element of unnatural isotopic composition be thoroughly mixed with the sample being analyzed. This freedom from the dependency on reproducibility of chemical reactions provides greater freedom from interference for other substances.

SUMMARY OF THE INVENTION

Briefly described the present invention as set forth in the disclosed embodiments comprises the method and apparatus for determining the concentration of selected compounds by measuring the nuclear reactions of a "doped" sample of the substance to be analyzed when irradiated by alpha particles. The energy of the alpha particles impinging on the sample is selected in certain applications to exploit large maxima in the backscattering across sections of the element to be measured and the added "doping"

isotope. Prior to the irradiation of the sample it is "spiked" with a known amount of a compound containing the element to be analyzed in the form of an unnatural isotopic mixture. The alpha particles backscattered from the various isotopes of the element to be measured should be for the lighter elements at sufficiently separated energies to be clearly resolvable, thereby providing an accurate measurement of the ratio of the compound whose concentration is to be measured to the known amount of the added "spiking" compound.

Thus in accordance with one aspect of this invention there is provided an improved method and apparatus for quantitatively analyzing selected substances capable of conversion to volatile forms. The disclosed method and apparatus is one which is adaptable to remote automatic monitoring of certain volatile substances contained within liquid or gaseous environments, especially compounds containing nitrogen or other elements convertible to volatile compounds, which elements have more than one stable isotope.

A feature of this invention is that it provides an accurate, and yet economical, means for quantitatively analyzing various forms of certain chemical substances.

Another feature of this invention is that it provides a compact, simple, and yet economical analyzer which is capable of accurately providing the concentration of certain selected compounds in volatile substances over a large range of concentrations.

BRIEF DESCRIPTION OF THE DRAWINGS

With these and other features in view, the invention comprises the method; and the construction, arrangement and combination of the various elements of the apparatus therefor, whereby the objectives contemplated are attempted as herein set forth, pointed out in the appended claims and illustrated in the accompanying drawings, wherein like reference numerals refer to like parts, and:

FIG. 1 is a block diagram of a system for quantitatively analyzing selected chemical substances in accordance with the principles of the subject invention;

FIG. 2 is a vertical sectional view of an alpha particle irradiation and sensor chamber suitable for use in the system of FIG. 1;

FIG. 3 is a horizontal sectional view of the chamber of FIG. 2; and

FIG. 4 is a graph of an alpha particle backscatter spectrum for explaining the operation of the subject invention.

DESCRIPTION OF THE PREFERRED EMBODIMENT

Referring first primarily to FIG. 1, a liquid sample to be analyzed is applied through an inlet port 10 to a chemical reaction (preprocessing) vessel 12. A measured amount of a compound of an element of interest with an unnatural isotopic composition is added through a selected one of a plurality of isotope inlet ports such as 14 or 16, and is mixed with the sample by a stirrer 18. As will be explained in detail hereinafter, certain chemical reactions are induced by a reaction agent added through an inlet port 20, by heat from a heater 22 and air applied through an air control valve 24. A drain valve 23 is provided to empty the vessel 12 after analysis of a particular sample has been completed.

A gas stream containing the compound to be analyzed (in a normal form produced from the liquid sample, and in a form containing the added isotope element) is injected into an alpha particle irradiation and sensor chamber 26 through a transfer valve 28 and an inlet tube 30; the chamber 26 having previously been at least partially evacuated by a vacuum pump 32. The chamber is normally filled with helium gas at atmospheric pressure to exclude air and to minimize alpha particle energy loss, but the chamber may also be operated under vacuum if preferred.

Referring now also to FIGS. 2 and 3, the gas stream applied through tube 30 impinges upon an activated charcoal plate 34 or a cold beryllium plate and the chamber 26 is then re-evacuated leaving some of the injected gas absorbed on the plate 34.

Alpha particles from a source 36 irradiate the plate 34 and a portion of these particles are scattered backward and detected by a detection unit 38. In response to the backscattered alpha particles impinging thereon, the detector 38 produces pulses of electrical current the amplitude of which is indicative of the nuclear mass of the isotope from which the alpha particles producing the pulse was reflected.

The output electrical pulses from detector 38 are applied on a cable 40 to an amplifier 42 and then to an energy level filter 44. Energy level filter 44 may be any one of the numerous suitable devices well known in the art (such as a "window detector or single channel or multi-channel analyzer") for providing an output pulse on a particular one of a plurality of output leads when the applied input signal is within a preselected amplitude range associated with said corresponding output channel. Each of the output leads of energy level filter 44 are coupled to associated input circuits of a recorder/counter unit 46 which may contain a counter register (not shown) for counting the number of output pulses of each channel of the filter 44; and a recorder for recording the output pulses associated with the different channels. The ratio of the counts corresponding to the various isotopes of the preselected element in the sample to be analyzed is indicative of the concentration of the compound being analyzed.

In remote monitoring applications the output counts stored in the counter register of unit 46 are telemetered to a remotely located central station (not shown) by transmitter 47. The count level threshold unit 49 senses when the count associated with one channel reaches a predetermined level, and then triggers the transmitter 47 to transmit the other count in the form of a digital data word. This mechanization allows data as to the isotope ratio to be transmitted by transmission of only one count from the counter register. Additionally the unit 46 may be reset by the trigger pulse from the count level threshold unit 49.

After one sample has been analyzed the charcoal plate 34 may be heated by a heater 48 which is supplied with electrical power through a pair of leads 50 passing through seals 52 in a wall of chamber 26, so as to purge the plate of the last gas sample in preparation for the next sample.

At the start of the next testing period the aqueous sample contained within vessel 12 may be heated or boiled by heater 22 to expel all significant traces of the compounds of the preceding test (said compounds being expelled through an exhaust valve 54) and a different isotope element and/or reaction agent is injected through inlet ports 16 and 20 respectively, and the above described sequence repeated for the next test to determine the concentration of a different compound of interest contained within the original sample.

Additionally it is noted that an absorber 56 may be positioned in front of the detector 38 to block reflected alpha particles while allowing protons liberated from the nuclei of the sample elements to be detected. The detected protons produce output pulses from the detector, which pulses may be counted as a check of the previously described alpha particle analysis.

The equipment components comprising the alpha particle emitter 36 and the detector unit 38 are commercially available. Alpha particle emitter 36 may be constructed by plating about 5 millicuries of curium 242 or 244, or polonium 210, or plutonium 238 onto the bottom of a small stainless steel cup. A protective coating of gold may be evaporated to the cup for prevention of spread of activity and to reduce the energy from the source to the desired value.

The detector 38 may comprise a silicon surface barrier detector suitably biased with a 100 micron depletion depth with an active surface area of 1.5 sq. cm.

In one preferred embodiment utilizing a 3 sq. cm. disc of charcoal, the significant dimensions are one inch spacings from plate 34 to the source 36, and from the plate 34 to the detector 38.

As mentioned previously, in the proton mode of operation (self checking feature) the absorber 56 is positioned in front of detector 38 by means of a push rod 58 and pivot coupling 60. For automated applications rod 58 is activated by a stepper motor 59. Absorber 56 may be constructed from a material which does not yield protons, having a thickness of approximately 10 mg. per sq. cm., such as nickel, gold or plastic foils.

The enclosure of chamber 26 may be constructed of brass with a polyethylene liner.

The subject invention is suitable to a wide range of applications and without distracting from generality it will now be explained relative to the analysis of various nitrogen compounds in liquid samples; as is particularly applicable to pollution measurement and abatement. For example, the method of the subject invention for determining the ammonium ion concentration and nitrate ion concentration in an aqueous sample is as follows:

(1) A liquid sample containing in the order of 100 micrograms dissolved nitrogen compounds is transferred to chemical reaction vessel 12 through inlet port 10;

(2) An aliquot containing 10 micrograms of nitrogen as ammonium chloride enriched with the rarer natural isotope nitrogen-15 is added to the sample through inlet port 14 and mixed therewith by stirrer 18;

(3) This solution is made strongly basic by adding sodium hydroxide pellets (ammonia free) through inlet port 20;

(4) The solution is heated by heater 22 and an air stream from control valve 24 bubbled through to expel ammonia;

(5) The gas stream containing ammonia is injected into the helium-filled chamber 26 through transfer valve 28, a portion of the ingested gas is absorbed by compacted charcoal disc absorber plate 34;

(6) The chamber 26 is then flushed with helium removing air, and leaving some of the ammonia absorbed on the plate 34;

(7) Alpha particles from source 36 of energy absorbed down to 4.5 million electron volts (mev.), impinge on plate 34 and a portion of the particles are scattered backward to silicon surface barrier detector 38 where their impinging energies are measurable, the 4.5 mev. alpha energy exploits large maxima in the backscatter cross sections of nitrogen-15 and nitrogen-14;

(8) The output pulses from the detector 38 corresponding to 1.5 mev. backscattered alpha particles are counted and recorded, as are the output pulses corresponding to 1.38 mev. backscattered alpha particles, and their ratio is directly proportional to the nitrogen-15/nitrogen-14 concentrations in the irradiated substance (the standardized amount of nitrogen-15 added when divided by this ratio gives the amount of nitrogen-14 in the form of ammonium ion);

(9) The charcoal plate 34 is next heated in the helium-filled chamber 26 to drive off the absorbed ammonia;

(10) The aqueous sample is further heated or boiled to expel ammonia to a concentration well below that of the nitrate to be measured;

(11) A standardized aliquot of nitrogen-15 in sodium nitrate solution is added to the vessel 12 through the inlet port 16 and stirred into mix;

(12) Metallic aluminum turnings (nitrogen free) are added to the hot, basic solution through inlet port 20 liberating hydrogen gas and reducing nitrate to ammonia which is carried out in the hydrogen gas stream through the transfer valve 28 to the chamber 26; and

(13) After some of the ammonia (a few micrograms) is absorbed on the charcoal plate, steps 6 through 8 are repeated to yield the measurement of the nitrate concentration.

It is noted that in the above-described nitrate analysis that nitrate may be analyzed separately from the nitrite by precipitating silver nitrite from the solution before analysis, or otherwise destroying nitrite before analyzing for nitrate.

Hence one aspect of the subject invention produces an inexpensive mass spectrographic method for the analysis of selected compounds in an aqueous sample by the addition of a standard amount of ammonium salt of the rare but stable, relatively inexpensive isotope nitrogen-15 before the sample is made basic and ammonia blown off. In accordance with the subject invention only the isotopic ratio nitrogen-14/nitrogen-15 need be measured and multiplied by the amount of standard added to determine the concentration of ammonium ions in the original sample. It matters not what percentage of the ammonium in the sample is recovered so long as there is enough for analysis of the isotopic ratio; and chemical isotope effects will be negligible for the nitrogen isotopes.

An important feature of the subject invention is that all samples are transferred to and from the alpha particle irradiation chamber 26 as volatile compounds such as ammonia or hydrogen cyanide, for example, thus making unnecessary the mechanical transfer of samples to and from the chamber as well as eliminating the necessity of evaporating solutions to form solid residues.

In some applications it may be preferable to first mix measured amounts of the sample and isotope substance in a separate chamber of vessel 12, prior to performing chemical preprocessing in another chamber of the vessel.

It is important to note that nitrogen-15 will not emit protons in response to 4.5 mev. alpha particles—which is a resonance for proton producing from nitrogen-14, and hence the proton count from the absorbed ammonia will uniquely measure the nitrogen-14 since the charcoal plate 34 cannot emit protons.

In the alpha particle counting mode the absorber 56 is removed from in front of the detector 38 and alpha particle peaks should be clearly resolvable for the nitrogen-15, nitrogen-14, and carbon 12 of the plate 34. FIG. 4 shows a hypothetical expected spectrum for a 100 microgram sample of ammonia (10 percent nitrogen-15 and 90 percent nitrogen-14) absorbed on plate 34. Nitrogen-15 has a strong scattering resonance at exactly the same energy 4.5 mev. at which nitrogen-14 has its principal proton production resonance and also an alpha particle scattering resonance in the backward direction. The energy peak at 1.5 mev. is directly proportionate to nitrogen-15, the peak at 1.38 mev. due to nitrogen-14 and the plateau due to the charcoal plate only rises below 1.13 mev. Hence the detector output signals should be easily separated by energy level filter 44.

In the proton mode, the protons are produced only by a nitrogen-14 and are characterized by a peak at 2.2 mev. thereby providing a redundancy in the nitrogen-14 measurement which is useful as a check feature.

Recalling that in accordance with the principles of the subject invention it is only necessary to obtain a fraction of the nitrogen of the sample, the ammonia evolution from basic solution, nitrate reduction by aluminum in a basic solution, or Kjeldahl digestion of organic nitrogen need not be complete or even of vaguely known yield to suffice since the samples for analysis are "spiked" with a known quantity of a nitrogen-15 compound and only the ratio is of importance. It is noted that the sensitivity of nitrogen-15 is about 10 times greater than that of nitrogen-14, and hence the sample is generally "spiked" with roughly an order of magnitude less nitrogen-15 than the expected amount of nitrogen-14 in the sample.

Although the above-described examples were concerned primarily with nitrogen compounds, it will be apparent to those skilled in the art that the subject invention is readily adaptable to the measurement of a wide range of other compounds. For example, nitrogen-15 may be added as sodium cyanide, then acidification performed to drive off hydrogen cyanide for absorption in the chamber 26, and hence determine the concentration of the exchangeable cyanide of the solution (not just the free cyanide, but including that in unionized hydrogen cyanide and in complex ions with heavy metals). Additionally organic nitrogen as urea or amino acid containing nitrogen-15 may be added followed by a Kjeldahl digestion, with the resulting ammonia applied to the chamber. Also various nitrogen compounds such as $NO_2$, $NO_3$, etc., in air or other gaseous samples may be analyzed by adding the gas of interest in nitrogen-15 form to a measured volume of sample, then carrying out appropriate concentration steps leading to the absorption of a nitrogen-containing gas on the charcoal plate 34 of the chamber 26.

The isotope ratio analysis method of the subject invention is also applicable to absorbable or freezable compounds of boron, carbon, oxygen, silicon, sulfur, and chlorine through the addition of a standard amount of a rare isotope composition, followed by a determination of the isotope ratio by the alpha bounce-back energy method. Examples of resolvable pairs of stable isotopes besides nitrogen are lithium (6 and 7), boron (10 and 11), carbon (12 and 13), sulfur (32 and 34) and oxygen (16 and 18).

For total organic carbon analysis the solution to be analyzed may be first acidified and blown to remove inorganic carbon, then "spiked" with carbon 13 methanol and burned in a hydrogen flame or in the alternative partially wel-ashed with acid permanganate performed. The resulting carbon dioxide, for example, would be trapped in an alkaline trap and later released for analysis in the nuclear analyzer 26. For carbon analysis the chamber 26 would be modified such that a coolable beryllium plate is provided for condensing a few mg. of carbon dioxide either pure or in an ice matrix. The change in the plate 34 for carbon analysis is required so that the backing plate will be of a lower atomic weight than the measured isotopes so as to achieve improved sensitivity. Also for the carbon analysis the irradiating alpha particle source should provide higher energy particles, since carbon 12 has a backscatter resonance at 5.85 mev.; although it also exhibits a large resonance at 4.42 mev.

Thus there has been described the method and apparatus for the precise measurement of the concentrations of certain chemical substances in fluid or gaseous environments. The system in accordance with the invention is relatively compact, simply and reliable and is capable of analysis over a very large range of concentrations even in brines. It is highly sensitive and requires only a few mg. of absorbed compound in the analysis chamber. The "thin" sample (for example less than ten percent of the penetration depth of the irradiating alpha particles) formed on plate 34, provides increased discernibility in the spectrum of the backscattered alpha particles. The subject invention is particularly applicable to pollution measurement and abatement uses and is particularly adaptable to the automated remote anlysis of water and air.

What is claimed is:

1. An apparatus for determining the concentration of a selected compound in a sample, said apparatus comprising:
   means for adding a measured amount of an isotopic mixture of an element of said selected compound to said sample;
   means for changing said sample and isotope mixture to provide in gaseous form, a quantity of said selected compound in the form of said isotope of said element;
   means for irradiating a portion of said gaseous compound provided by said means for changing with alpha particles; and
   sensor means for detecting a portion of said alpha particles backscattered from said irradiated gaseous compound and for providing electrical pulses the amplitude of which are indicative of the energy of said detected alpha particles.

2. The apparatus of claim 1 further comprising means coupled to said sensor means for determining the number of said electrical pulses in amplitude ranges associated with the energy levels of alpha particles backscattered from said element and said isotope, respectively.

3. The apparatus of claim 1 wherein said sample is a liquid and said means for changing includes means for adding a reaction agent to said sample-isotope mixture.

4. The apparatus of claim 1 further comprising means for detecting the protons liberated from the nuclei of an element of said irradiated compound by said alpha particles, and for providing electrical pulses the amplitude of which are indicative of the energy of said protons.

5. The apparatus of claim 4 wherein said means for detecting protons includes an alpha particle absorber device positionable between said irradiated compound and said sensor means.

6. The apparatus of claim 1 wherein said means for changing further includes means for heating said sample-isotope mixture.

7. The apparatus of claim 6 wherein said means for changing further includes means for passing an air stream through said sample-isotope mixture.

8. The apparatus of claim 1 wherein said means for irradiating includes means for impinging a stream of said gaseous compound onto a plate of lower atomic weight than said element adapted for absorbing a portion of said gaseous compound; and an alpha particle source disposed to irradiate said plate.

9. The apparatus of claim 8 further comprising means for heating said plate to expel said absorbed gases therefrom in preparation for the analysis of a next sample.

10. The apparatus of claim 8 further comprising a chamber enclosing said means for irradiating and said sensor means; and means for partially evacuating said chamber.

11. The apparatus of claim 10 further comprising a vessel enclosing said means for processing; and means including a controllable transfer valve, for applying said gaseous compound from said vessel to said chamber.

12. The apparatus of claim 8 wherein said means for adding includes means for adding nitrogen-14 compounds; and wherein said sensor means includes a silicon barrier detector, said plate comprises activated charcoal and said means for irradiating includes a radioactive alpha particle source.

13. The apparatus of claim 12 wherein said means for processing includes means for adding aluminum to and for heating said sample-isotope mixture.

14. The apparatus of claim 12 wherein means for adding includes means for adding sodium cyanide enriched with nitrogen-15; and said means for processing includes means for acidification of the sample isotope mixture.

15. The apparatus of claim 12 wherein said means for adding includes means for adding ammonium chloride enriched with nitrogen-15; and said means for processing includes means for adding sodium hydroxide to said sample-isotope mixture.

16. The method for determining the concentration of a selected compound in a sample, said method comprising the steps of:
   adding a measured amount of an isotope of an element of said selected compound to said sample;
   changing said sample and isotope mixture to provide in gaseous form a quantity of said selected compound in the form of both said element in natural and unnatural isotopic abundancy;
   irradiating a portion of said gaseous compound from said processing step, with alpha particles;
   detecting a portion of said alpha particles backscattered from said irradiated compound; and providing electrical pulses the amplitude of which are indicative of the energy of said detected alpha particles.

17. The method of claim 16 further comprising the step of determining the number of said electrical pulses in amplitude ranges associated with the energies of alpha particles backscattered from said isotopes of said element.

18. The method of claim 16 further comprising the step of detecting the protons liberated from the nuclei of an element of said irradiated compound by said alpha particles, and for providing electrical pulses the amplitude of which are indicative of the energy level of said protons.

19. The method of claim 16 for measuring nitrogen-14 compounds, and wherein said irradiating step includes the step of irradiating with approximately a 4.5 million electron volt energy alpha particles.

20. The step of claim 16 wherein said processing test further includes the step of heating said sample-isotope mixture.

21. The method of claim 20 wherein said processing step further includes passing an air stream through said sample-isotope mixture.

22. The method of claim 16 wherein said irradiating step includes the step of impinging a stream of said gaseous compound onto a plate of lower atomic weight than said element and adapted for absorbing a portion of said gaseous compound; and of positioning an alpha particle source so as to irradiate said plate.

23. The method of claim 22 further comprising the step of performing said irradiating and detecting steps in an evacuated chamber.

24. The method of claim 22 further comprising the step of heating said plate to expel said absorbed gases therefrom in preparation for the analysis of a next sample.

25. The method of claim 16 wherein said sample is a liquid and said processing step includes adding a reaction agent to said sample-isotope mixture.

26. The method of claim 25 wherein said adding step includes adding ammonium chloride enriched with nitrogen-15; and said processing step includes adding sodium hydroxide to said sample-isotope mixture.

27. The method of claim 25 wherein said processing step includes adding aluminum to and heating said sample-isotope mixture.

28. The method of claim 25 wherein said adding step includes adding sodium cyanide enriched with nitrogen-15; and said processing step includes the step of acidification of the sample isotope mixture.

29. The method of claim 25 further comprising the steps of performing said processing step in a vessel and applying said gaseous compound from said vessel to said chamber in the form of a gas stream.

References Cited
UNITED STATES PATENTS 3,186,799   6/1965   Hach _____ 23—230 RX

OTHER REFERENCES

Turkevich, A., Science, 134, Sept. 8, 1961, pp. 672–674.

MORRIS O. WOLK, Primary Examiner

R. M. REESE, Assistant Examiner

U.S. Cl. X.R.

23—232 R; 250—43.5 D